United States Patent
Kroizer

(10) Patent No.: US 9,541,071 B2
(45) Date of Patent: *Jan. 10, 2017

(54) CONCENTRATED SOLAR POWER PLANT WITH INDEPENDENT SUPERHEATER

(71) Applicant: BRIGHTSOURCE INDUSTRIES (ISRAEL) LTD., Jerusalem (IL)

(72) Inventor: Israel Kroizer, Jerusalem (IL)

(73) Assignee: Brightsource Industries (Israel) Ltd., Jerusalem (IL)

( * ) Notice: Subject to any disclaimer, the term of this patent is extended or adjusted under 35 U.S.C. 154(b) by 233 days.

This patent is subject to a terminal disclaimer.

(21) Appl. No.: 14/092,130

(22) Filed: Nov. 27, 2013

(65) Prior Publication Data

US 2014/0152024 A1  Jun. 5, 2014

Related U.S. Application Data

(60) Provisional application No. 61/733,019, filed on Dec. 4, 2012.

(51) Int. Cl.
F03G 6/06 (2006.01)

(52) U.S. Cl.
CPC ............... *F03G 6/065* (2013.01); *F03G 6/06* (2013.01); *Y02E 10/46* (2013.01); *Y02E 20/14* (2013.01)

(58) Field of Classification Search
CPC ............ F03G 6/065; F03G 6/06; Y02E 20/14; Y02E 10/46

(Continued)

(56) References Cited

U.S. PATENT DOCUMENTS

| 2,933,885 A | 4/1960 | Vago et al. |
| 3,977,197 A | 8/1976 | Brantley et al. |

(Continued)

FOREIGN PATENT DOCUMENTS

| DE | 2510168 A1 | 9/1976 |
| DE | 10329623 B3 | 1/2005 |

(Continued)

OTHER PUBLICATIONS

Abengoa Solar, Inc., "Advanced Thermal Storage for Central Receivers with Supercritical Coolants," Grant DE-FG36-08GO18149, Jun. 2010.

(Continued)

*Primary Examiner* — Hoang Nguyen
(74) *Attorney, Agent, or Firm* — Potomac Law Group, PLLC; Mark Catan

(57) ABSTRACT

Steam can be generated using insolation by a solar collection system. A thermal storage system can store enthalpy in insolation-generated steam at times and can generate steam from stored enthalpy at other times. During some operating periods, a gas-fired superheater can further heat the generated steam to provide superheated steam to generate electricity. Steam at a substantially uniform electricity generating temperature may be produced selectively and at different operating periods from insolation only, from insolation and gas firing, from transfer of enthalpy from a thermal storage system and gas firing, or from a combination of insolation, stored enthalpy transfer, and gas firing. Operating periods can be characterized by at least one of an insolation level, a time of day, or a stage in the operation process. The generated steam can be used in the production of electricity.

20 Claims, 8 Drawing Sheets

(58) Field of Classification Search
USPC .......................................... 60/641.8–641.15
See application file for complete search history.

(56) References Cited

U.S. PATENT DOCUMENTS

| | | | |
|---|---|---|---|
| 4,079,591 A | 3/1978 | Derby et al. | |
| 4,094,148 A | 6/1978 | Nelson | |
| 4,119,143 A | 10/1978 | Robinson, Jr. | |
| 4,171,617 A | 10/1979 | Sakamoto et al. | |
| 4,192,144 A | 3/1980 | Pierce | |
| 4,265,223 A | 5/1981 | Miserlis et al. | |
| 4,438,630 A | 3/1984 | Rowe | |
| 4,455,826 A | 6/1984 | Knoos | |
| 5,047,654 A | 9/1991 | Newman | |
| 5,269,145 A | 12/1993 | Krause et al. | |
| 5,417,052 A | 5/1995 | Bharathan et al. | |
| 5,806,317 A | 9/1998 | Kohler et al. | |
| 6,279,312 B1 | 8/2001 | Hennecke | |
| 6,701,711 B1 | 3/2004 | Litwin | |
| 6,941,759 B2 | 9/2005 | Bellac et al. | |
| 6,957,536 B2 | 10/2005 | Litwin et al. | |
| 6,996,988 B1 | 2/2006 | Bussard | |
| 7,191,597 B2 | 3/2007 | Goldman | |
| 7,296,410 B2 | 11/2007 | Litwin | |
| 7,299,633 B2 | 11/2007 | Murphy et al. | |
| 7,654,073 B2 | 2/2010 | Primlani | |
| 7,685,820 B2 | 3/2010 | Litwin et al. | |
| 7,882,832 B2 | 2/2011 | Filippone | |
| 7,987,844 B2 | 8/2011 | Zillmer et al. | |
| 2006/0225729 A1 | 10/2006 | Litwin | |
| 2007/0157614 A1* | 7/2007 | Goldman | 60/641.15 |
| 2008/0000231 A1 | 1/2008 | Litwin et al. | |
| 2008/0276616 A1 | 11/2008 | Flynn et al. | |
| 2009/0121495 A1 | 5/2009 | Mills | |
| 2009/0125152 A1 | 5/2009 | Skowronski et al. | |
| 2009/0217921 A1 | 9/2009 | Gilon et al. | |
| 2009/0229264 A1 | 9/2009 | Gilon et al. | |
| 2009/0260359 A1 | 10/2009 | Palkes | |
| 2009/0260622 A1 | 10/2009 | Palkes et al. | |
| 2009/0261591 A1 | 10/2009 | Palkes et al. | |
| 2009/0320828 A1 | 12/2009 | Koketsu et al. | |
| 2009/0322089 A1 | 12/2009 | Mills et al. | |
| 2010/0191378 A1 | 7/2010 | Gilon et al. | |
| 2010/0199669 A1 | 8/2010 | Gathmann | |
| 2010/0212318 A1 | 8/2010 | Schaal | |
| 2010/0236239 A1 | 9/2010 | Kroizer et al. | |
| 2010/0295306 A1 | 11/2010 | Ridnik et al. | |
| 2011/0025068 A1 | 2/2011 | Campbell | |
| 2011/0100004 A1* | 5/2011 | Al-Mazeedi | 60/641.8 |
| 2011/0127773 A1 | 6/2011 | Freund et al. | |
| 2011/0153095 A1 | 6/2011 | Rock et al. | |
| 2011/0198208 A1 | 8/2011 | Olwig et al. | |
| 2011/0232629 A1 | 9/2011 | Mandel | |
| 2011/0314812 A1 | 12/2011 | Sonwane | |
| 2012/0103321 A1 | 5/2012 | Coventry | |
| 2012/0186251 A1* | 7/2012 | Epstein et al. | 60/641.11 |
| 2012/0216536 A1 | 8/2012 | Ma et al. | |
| 2012/0296479 A1 | 11/2012 | Millar et al. | |
| 2012/0319410 A1 | 12/2012 | Ambrosek et al. | |
| 2013/0049368 A1* | 2/2013 | Kaufmann et al. | 290/52 |
| 2013/0081394 A1 | 4/2013 | Perry | |
| 2013/0098354 A1 | 4/2013 | Kummamuru | |
| 2013/0147197 A1 | 6/2013 | Goebel et al. | |
| 2013/0255254 A1 | 10/2013 | Ehrsam et al. | |
| 2013/0285380 A1* | 10/2013 | Afremov | 290/52 |
| 2013/0292084 A1* | 11/2013 | Luz et al. | 165/10 |
| 2013/0307273 A1* | 11/2013 | Afremov et al. | 290/52 |
| 2014/0075939 A1 | 3/2014 | Aga et al. | |
| 2014/0116048 A1 | 5/2014 | Li et al. | |

FOREIGN PATENT DOCUMENTS

| | | |
|---|---|---|
| EP | 02275649 | 1/2011 |
| WO | WO 2008/154599 | 12/2008 |
| WO | WO 2010/006942 | 1/2010 |
| WO | WO 2011/140021 | 11/2011 |
| WO | WO 2012/006288 | 1/2012 |
| WO | WO 2012/093354 | 7/2012 |
| WO | WO 2012/107811 | 8/2012 |
| WO | WO 2013/018014 | 2/2013 |

OTHER PUBLICATIONS

Kirby, Brendan J., "Frequency Regulation Basics and Trends," Oak Ridge National Laboratory, U.S. Department of Energy, Dec. 2004 [retrieved on Jul. 14, 2014]. Retrieved from the Internet: <URL:http://www.ferc.gov/CalendarFiles/20100526085937-Kirby,%20Frequency%20Regulation%20Basics%20and%20Trends.pdf> ORNL/TM-2004/291.

* cited by examiner

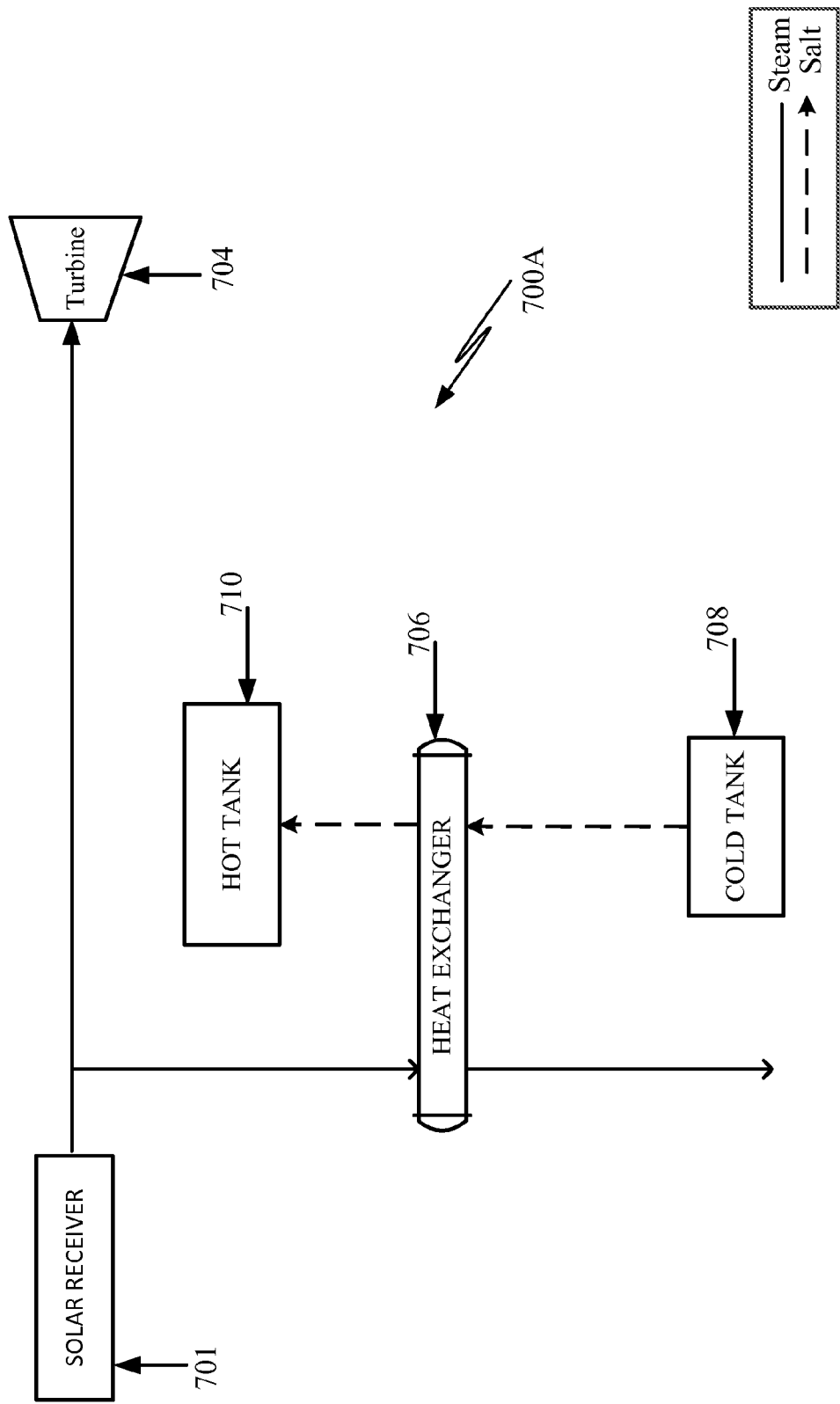
FIG. 7A – Highest level of insolation

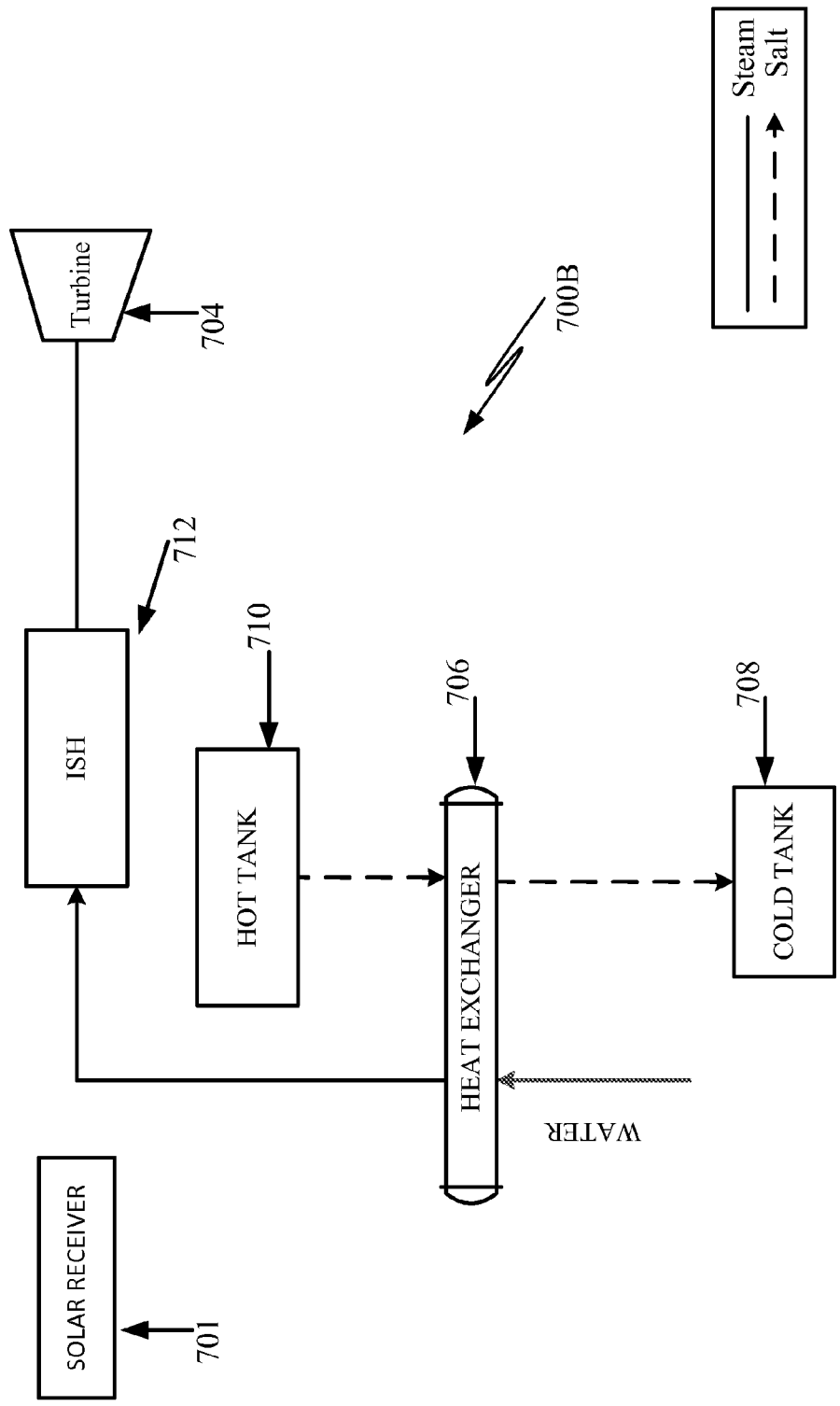
FIG. 7B - Lowest level of insolation

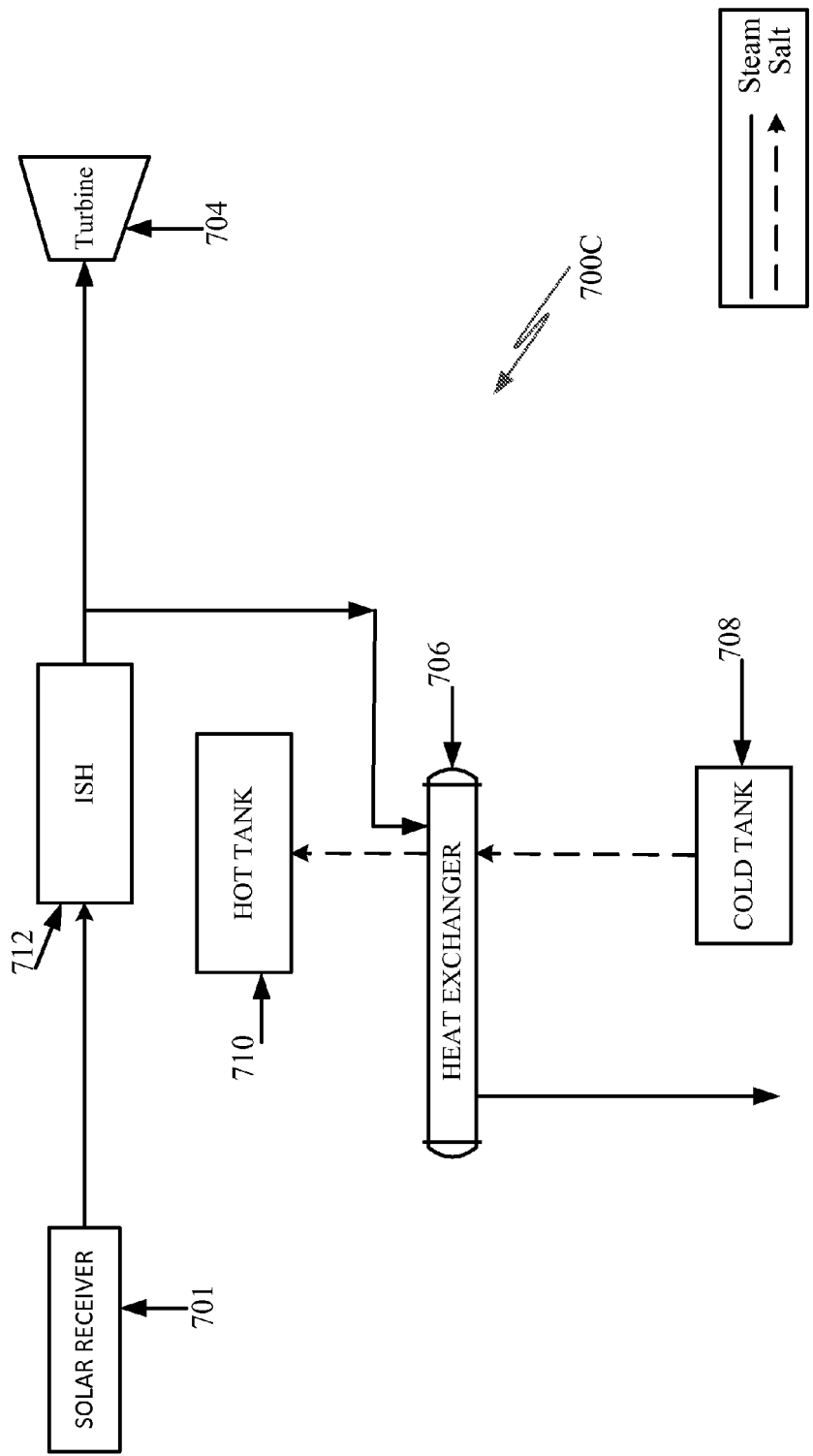
FIG. 7C - 2nd highest level of insolation

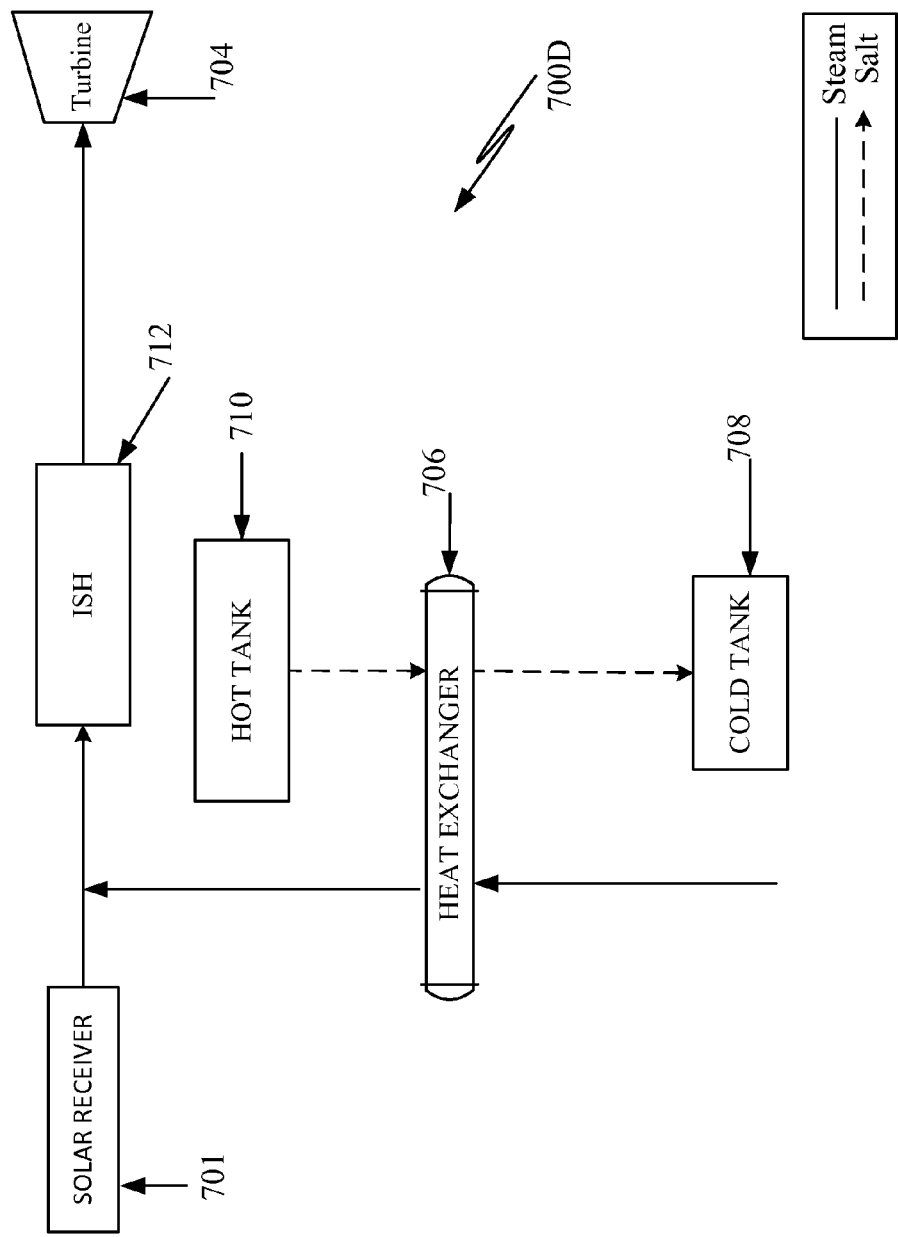
FIG. 7D - 3rd highest level of insolation

CONCENTRATED SOLAR POWER PLANT WITH INDEPENDENT SUPERHEATER

CROSS-REFERENCE TO RELATED APPLICATIONS

The present application claims the benefit of U.S. Provisional Application No. 61/733,019, filed Dec. 4, 2012, which is hereby incorporated by reference herein in its entirety.

FIELD

The present disclosure relates generally to the conversion of solar radiation to usable forms of energy, such as heat and/or electricity, and, more particularly, to systems and methods for the use of an independent superheater for boosting steam temperature.

SUMMARY

Insolation can be used to heat a solar fluid (e.g., water or carbon dioxide) for use in generating electricity (e.g., via a steam turbine). During periods of relatively higher insolation, there can be excess heat energy (i.e., enthalpy) in superheated solar fluid than what is needed for electricity generation. In contrast, during periods of relatively lower insolation (e.g., cloud cover or at night), the enthalpy in the solar fluid can be insufficient to generate electricity. In general, during the periods of relatively higher insolation, the excess enthalpy can be stored in a thermal storage system (i.e., charging the storage system) for subsequent use, for example, during periods of relatively lower insolation or at times when supplemental electricity generation is necessary (e.g., during peak power periods). The enthalpy remaining in the resulting de-superheated solar fluid can be used for other applications, such as, but not limited to, preheating the solar fluid for an evaporating solar receiver, supplementing the input to a superheating solar receiver, domestic or industrial applications, resource extraction, and fuel production.

A superheater, such as a gas-fired superheater, may be used to directly heat steam emanating from a solar receiver or from a thermal storage system or from a combination of both a solar receiver and a thermal storage system. A control system can be used to determine when to utilize an independent super heater (ISH) based on, among other determinative factors, average insolation levels.

There can be at least four operating periods/modes which determine if and to what extent the use of the independent superheater is needed to further heat the steam generated in the solar receiver and/or the thermal storage system.

At a first operating period, steam generated by the solar collection system is further heated by the gas-fired superheater which then flows to an electricity generating system; and at a second operating period, steam generated by the transfer of enthalpy from the thermal storage fluid is further heated by the gas-fired superheater and is then flows to the electricity generating system.

At a third operating period, steam generated by the solar collection system flows to the electricity generating system without further heating by the gas-fired superheater.

At a fourth operating period, steam generated by the solar collection system may be mixed with steam generated by the transfer of enthalpy from the thermal storage fluid is further heated by the gas-fired superheater and then flows to the electricity generating system.

For example, the four abovementioned periods can be characterized by any of the following: an insolation level, a time of day, or a stage in the operation process. An insolation level can be measured instantaneously or as an average over a period of about a second to several hours in which present and/or past and/or predicted meteorological data is analyzed. A stage of the process may include start-up or shut-down of the system.

The third operating period may have the highest level of insolation, the first operating period may have the second highest level of insolation, the fourth operating period may have the third highest level of insolation and the second operating period may have the lowest level of insolation.

According to some embodiments, the temperature of the heated steam in the first to fourth operating periods is approximately the same. In other words, the temperature of the steam exiting the solar collection system during the third operating period may be approximately the same as the temperature of the steam exiting the independent superheater during the first, second and fourth operating period. The steam temperature after superheating by the independent superheater can be in the range of 450-600° C. According to some embodiments, the steam temperature after superheating can be in the range of 550-600° C.

The level of insolation can be determined by using any of past, present, and predicted meteorological data measured over a period of a few seconds to a few hours.

Enthalpy in the thermal energy system can be transferred via a heat exchanger from a thermal storage fluid which can be for example a molten salt or a molten metal.

An example of a solar collection system can include reflecting insolation onto one or more solar receivers surrounded by a plurality of heliostats.

In some embodiments, a system for generating electricity using insolation may comprise a solar collection system adapted to convert solar insolation to thermal energy and transfer the thermal energy to water or water vapor conveyed therethrough to generate superheated steam; a thermal energy storage system including at least first and second thermal storage reservoirs configured to store a thermal energy storage fluid comprising at least one of a molten salt and a molten metal and to transfer therefrom enthalpy to water or steam from a supply thereof; an electricity generating system including a turbine, configured to generate electricity using steam conveyed thereto; a heat exchanger connected between the solar collection system and the thermal energy storage system and the electricity generating system and configured such that enthalpy can be selectively transferred from the superheated steam generated by the solar collection system to the thermal energy storage fluid stored by the first and second storage reservoirs or transferred directly to water or steam flowing from said supply to generate steam or superheated steam; a gas-fired steam superheater; and a control system configured to control the system such that at a first operating period, steam generated by the solar collection system is further heated thereby to an electricity generating temperature solely using thermal energy converted from insolation and is conveyed to the electricity generating system, and at a second operating period, steam generated with enthalpy transferred from the thermal storage fluid is further heated by the gas-fired superheater to a higher temperature that is substantially the same as said electricity generating temperature and is conveyed to the electricity generating system, wherein said first and second operating periods are characterized by at least one of an insolation level, a time of day, or a stage in the operation process.

A control system may be further configured to control the system such that, at a third operating period, steam generated by the solar collection system is further heated by the gas-fired superheater to a higher temperature that is substantially the same as said electricity generating temperature and is conveyed to the electricity generating system, and the third operating period is also characterized by at least one of an insolation level, a time of day, or a stage in the operation process.

A control system may be further configured to control the system such that, at a fourth operating period, a mixture of steam generated by the solar collection system and steam generated by the transfer of enthalpy from the thermal storage fluid is further heated by the gas-fired to a higher temperature that is substantially the same as said electricity generating temperature and is conveyed to the electricity generating system, and the fourth operating period is also characterized by at least one of an insolation level, a time of day, or a stage in the operation process.

In some embodiments, a method for generating electricity using insolation may comprise, at a first operating period, generating steam at a first temperature at a pressure greater than atmospheric pressure in a solar collection system using insolation and further heating the steam therein using insolation to a second temperature for generating electricity; and, at a second operating period, generating steam at a third temperature in a heat exchanger with enthalpy transferred from a thermal storage fluid and further heating the steam in a gas-fired superheater to a fourth temperature for generating electricity, where the second and fourth temperatures are substantially the same temperature.

At least a portion of the steam generated and further heated by thermal energy converted from insolation at the first operating period may be directed to a heat exchanger where enthalpy from the steam is transferred to a thermal storage fluid comprising at least one of a molten salt and a molten metal.

In some embodiments, the method may also comprise, at a third operating period, generating steam at a fifth temperature in the solar collection system using insolation at a pressure greater than atmospheric pressure and further heating it in the gas-fired superheater to a sixth temperature for generating electricity, where the second, fourth, and sixth temperatures are substantially the same temperatures.

In some embodiments, the method may also comprise, at a fourth operating period, (i) combining steam generated at a seventh temperature in the solar collection system using insolation, with steam generated at an eighth temperature in the heat exchanger with enthalpy transferred from the thermal storage fluid; and (ii) further heating the combined steam in the gas-fired superheater to a ninth temperature, where the second, fourth, and ninth temperatures are substantially the same temperatures.

The first to fourth operating periods may be characterized by at least any one of an insolation level, a time of day, or a stage in the operation process. In some embodiments, the first operating period may have the highest level of insolation, the third operating period may have the second highest level of insolation, the fourth operating period may have the third highest level of insolation and the second operating period may have the lowest level of insolation. In some embodiments, a stage of the operating process may be during start-up or shut-down of the system.

In some embodiments, a method for generating electricity using insolation may comprise, at a first time, producing steam at an electricity generating temperature using sequential heating by insolation and then by a gas-fired superheater, conveying the produced steam to an electricity generating system and generating electricity from the steam, and, at a second time, producing steam at the electricity generating temperature using sequential heating by enthalpy stored in a thermal energy storage and then by the gas-fired superheater, conveying the produced steam to an electricity generating system and generating electricity from the steam. In some embodiments, the method may further comprise, at other times, producing steam at the electricity generating temperature by heating a first portion of the steam using insolation, by heating a second portion of the steam using enthalpy stored in a thermal energy storage, and by subsequent heating of the portions by the gas-fired superheater. In some embodiments, the method may further comprise, at other times, producing steam at the electricity generating temperature solely by heating using insolation. At least a portion of the steam can be directed to a heat exchanger where enthalpy from the steam is transferred to a thermal storage fluid and stored therein.

Objects and advantages of embodiments of the present disclosure will become apparent from the following description when considered in conjunction with the accompanying drawings.

BRIEF DESCRIPTION OF DRAWINGS

Embodiments will hereinafter be described with reference to the accompanying drawings, which have not necessarily been drawn to scale. Where applicable, some features have not been illustrated to assist in the illustration and description of underlying features. Throughout the figures, like reference numerals denote like elements.

FIGS. 7A-7D are simplified diagrams showing the interaction between a solar collection system, a thermal storage system, an independent superheater and an electricity generation system, according to one or more embodiments of the disclosed subject matter.

DETAILED DESCRIPTION

Figure 1:
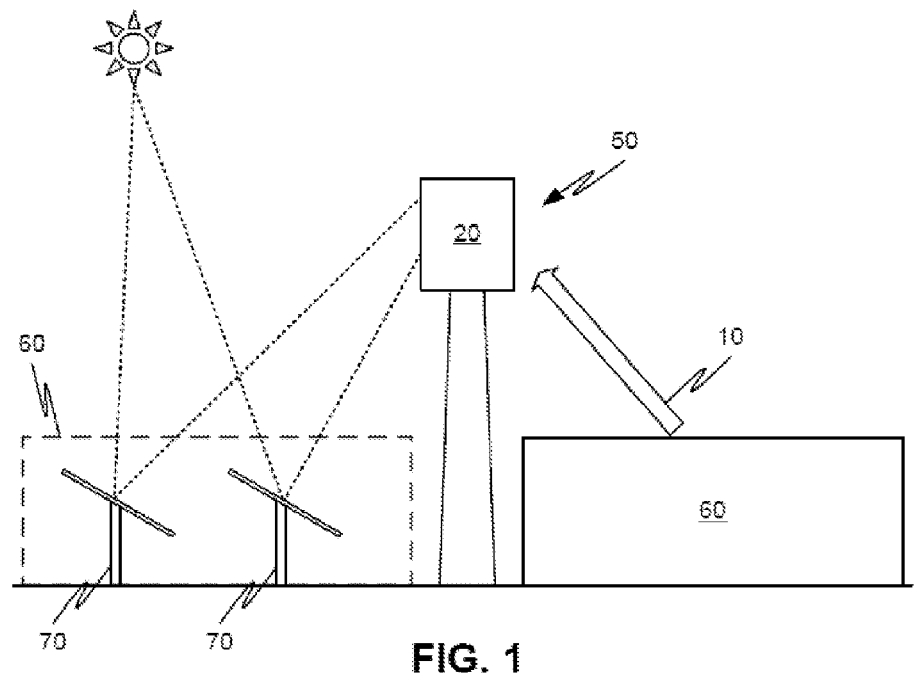
FIG. 1 shows a solar power tower system, according to one or more embodiments of the disclosed subject matter.

Insolation can be used by a solar collection system to generate supercritical steam and/or for heating molten salt. In FIG. 1, a solar collection system can include a solar tower 50 that receives reflected focused sunlight 10 from a solar field 60 of heliostats (individual heliostats 70 are illustrated in the left-hand portion of FIG. 1). For example, the solar tower 50 can have a height of at least 25 meters, 50 meters, 75 meters, 150 meters, or higher. The heliostats 70 can be aimed at solar energy receiver system 20, for example, a solar energy receiving surface of one or more receivers of system 20. Heliostats 70 can adjust their orientation to track the sun as it moves across the sky, thereby continuing to reflect sunlight onto one or more aiming points associated with the receiver system 20. A solar energy receiver system 20, which can include one or more individual receivers, can be mounted in or on solar tower 50. The solar receivers can be constructed to heat water and/or steam and/or supercritical steam and/or any other type of solar fluid using insolation received from the heliostats. Alternatively or additionally, the target or receiver 20 can include, but is not limited to, a photovoltaic assembly, a steam-generating assembly (or another assembly for heating a solid or fluid), a biological growth assembly for growing biological matter (e.g., for producing a biofuel), or any other target configured to convert focused insolation into useful energy and/or work.

Figure 2:
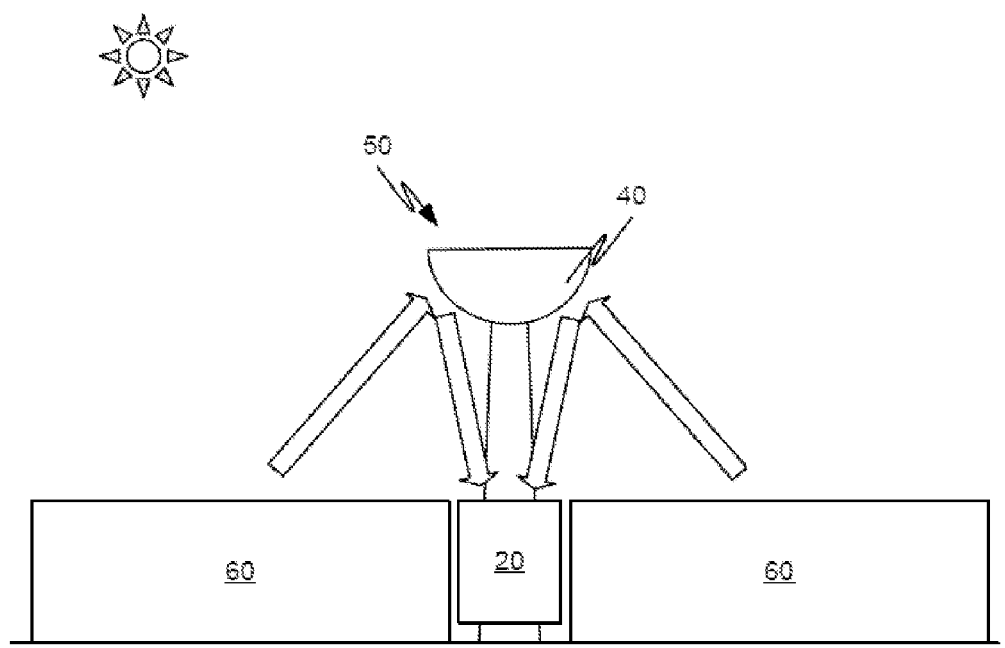
FIG. 2 shows a solar power tower system with secondary reflector, according to one or more embodiments of the disclosed subject matter.

In another embodiment, a secondary reflector 40 can be arranged at or near the top of a tower 50, as shown in FIG. 2. The secondary reflector 40 can thus receive the insolation from the field of heliostats 60 and redirect the insolation (e.g., through reflection) toward a solar energy receiver system 20. The solar energy receiver system 20 can be arranged within the field of heliostats 60, outside of the field of heliostats 60, at or near ground level, at or near the top of another tower 50, above or below reflector 40, or elsewhere.

More than one solar tower 50 can be provided, each with a respective solar energy receiving system thereon, for example, a solar power steam system. The different solar energy receiving systems can have different functionalities. For example, one of the solar energy receiving systems can heat water using the reflected solar radiation to generate steam while another of the solar energy receiving systems can serve to superheat steam using the reflected solar radiation. The multiple solar towers 50 can share a common heliostat field 60 or have respective separate heliostat fields. Some of the heliostats can be constructed and arranged so as to alternatively direct insolation at solar energy receiving systems in different towers. In addition, the heliostats can be configured to direct insolation away from any of the towers, for example, during a dumping condition.

Figure 3:
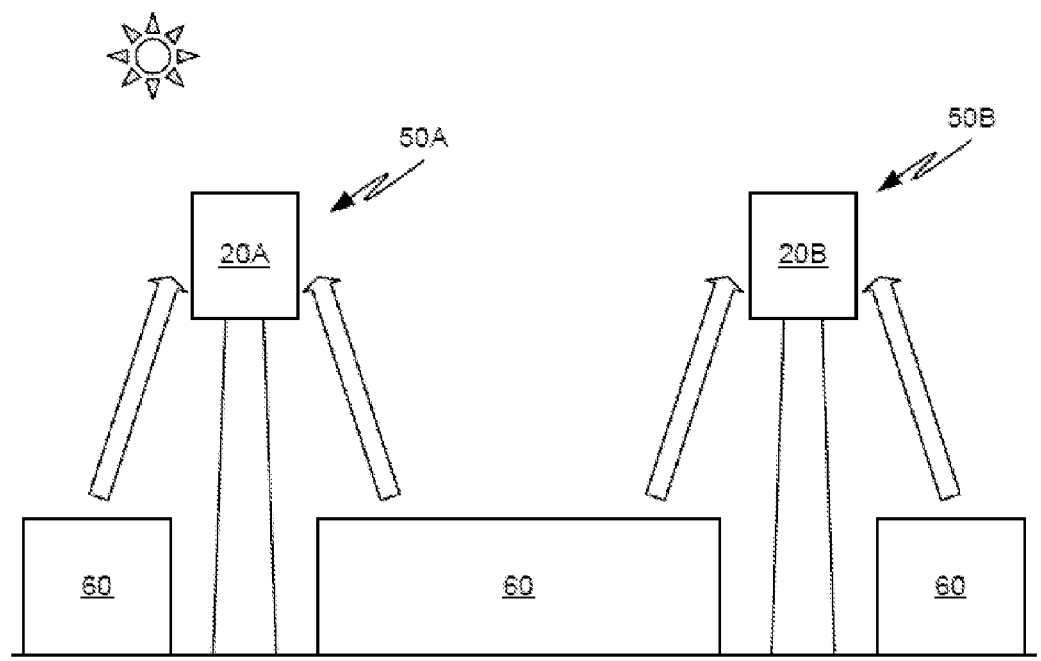
FIG. 3 shows a solar power tower system including multiple towers, according to one or more embodiments of the disclosed subject matter.

As shown in FIG. 3, two solar towers can be provided, each with a respective solar energy receiving system. A first tower 50A has a first solar energy receiving system 20A while a second tower 50B has a second solar energy receiving system 20B. The solar towers 50A, 50B are arranged so as to receive reflected solar radiation from a common field of heliostats 60. At any given time, a heliostat within the field of heliostats 60 can be directed to a solar receiver of any one of the solar towers 50A, 50B. Although only two solar towers with respective solar energy receiving systems are shown in FIG. 3, any number of solar towers and solar energy receiving systems can be employed.

Figure 4:
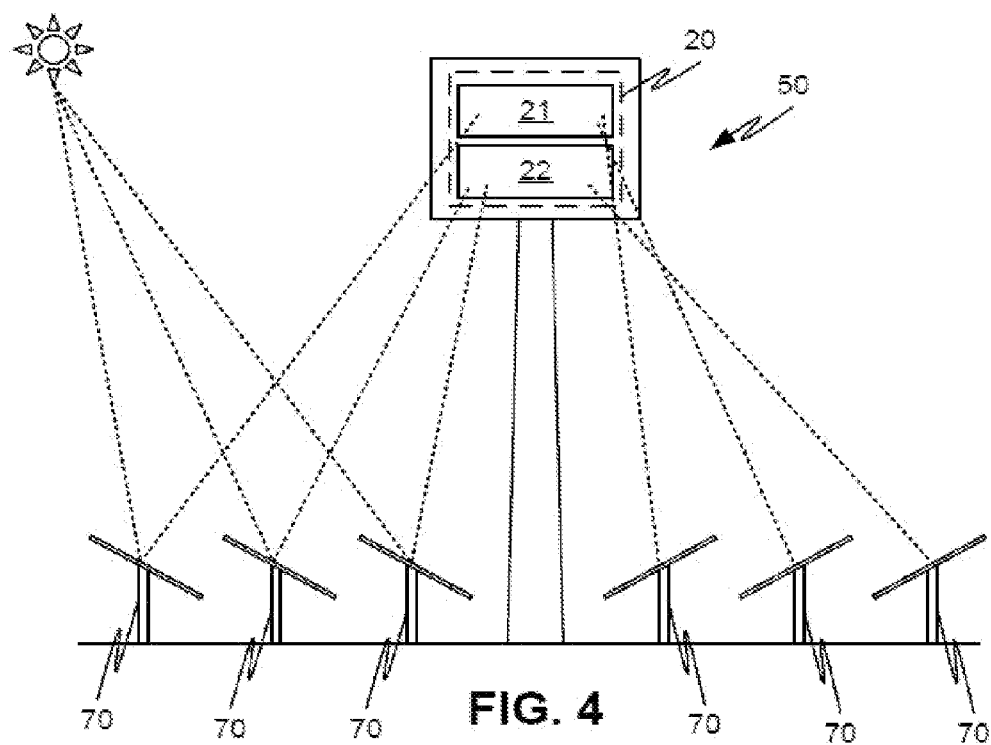
FIG. 4 shows a solar power tower system including multiple receivers in a single tower, according to one or more embodiments of the disclosed subject matter.

More than one solar receiver can be provided on a solar tower. The multiple solar receivers in combination can form a part of the solar energy receiving system 20. The different solar receivers can have different functionalities. For example, one of the solar receivers can heat water using the reflected solar radiation to generate steam while another of the solar receivers can serve to superheat steam using the reflected solar radiation. The multiple solar receivers can be arranged at different heights on the same tower or at different locations (e.g., different faces, such as a north face, a west face, etc.) on the same tower. Some of the heliostats in field 60 can be constructed and arranged so as to alternatively direct insolation at the different solar receivers. As shown in FIG. 4, two solar receivers can be provided on a single tower 50. The solar energy receiving system 20 thus includes a first solar receiver 21 and a second solar receiver 22. At any given time, a heliostat 70 can be aimed at one or both of the solar receivers, or at none of the receivers. In some use scenarios, the aim of a heliostat 70 can be adjusted so as to move the reflected beam projected at the tower 50 from one of the solar receivers (e.g., 21) to the other of the solar receivers (e.g., 22). Although only two solar receivers and a single tower are shown in FIG. 4, any number of solar towers and solar receivers can be employed.

Figure 5:
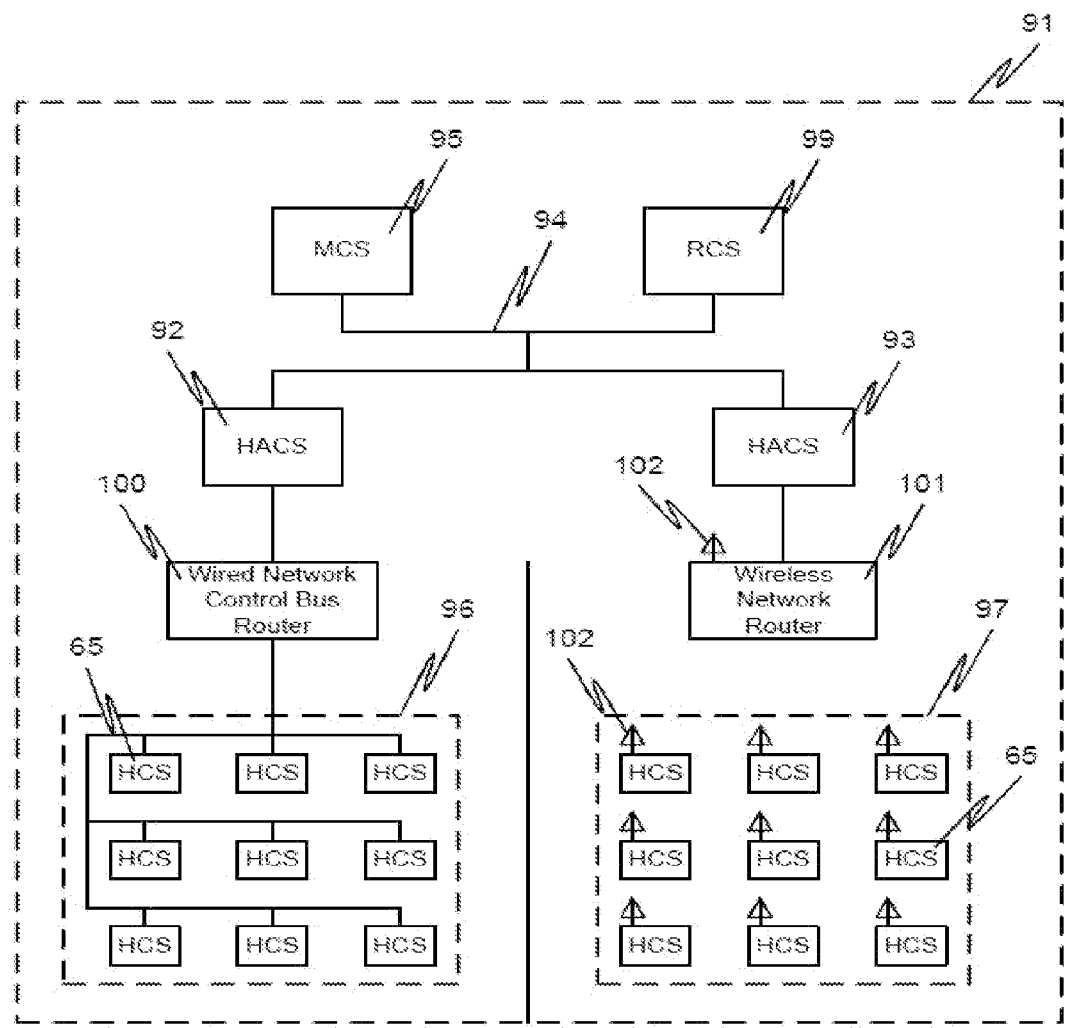
FIG. 5 is a schematic diagram of a heliostat control system, according to one or more embodiments of the disclosed subject matter.

Heliostats 70 in a field 60 can be controlled through a central heliostat field control system 91, for example, as shown in FIG. 5. For example, a central heliostat field control system 91 can communicate hierarchically through a data communications network with controllers of individual heliostats. FIG. 5 illustrates a hierarchical control system 91 that includes three levels of control hierarchy, although in other implementations there can be more or fewer levels of hierarchy, and in still other implementations the entire data communications network can be without hierarchy, for example, in a distributed processing arrangement using a peer-to-peer communications protocol.

At a lowest level of control hierarchy (i.e., the level provided by heliostat controller) in the illustration there are provided programmable heliostat control systems (HCS) 65, which control the two-axis (azimuth and elevation) movements of heliostats (not shown), for example, as they track the movement of the sun. At a higher level of control hierarchy, heliostat array control systems (HACS) 92, 93 are provided, each of which controls the operation of heliostats 70 (not shown) in heliostat fields 96, 97, by communicating with programmable heliostat control systems 65 associated with those heliostats 70 through a multipoint data network 94 employing a network operating system such as CAN, Devicenet, Ethernet, or the like. At a still higher level of control hierarchy a master control system (MCS) 95 is provided which indirectly controls the operation of heliostats in heliostat fields 96, 97 by communicating with heliostat array control systems 92, 93 through network 94. Master control system 95 further controls the operation of a solar receiver (not shown) by communication through network 94 to a receiver control system (RCS) 99.

In FIG. 5, the portion of network 94 provided in heliostat field 96 can be based on copper wire or fiber optic connections, and each of the programmable heliostat control systems 65 provided in heliostat field 96 can be equipped with a wired communications adapter, as are master control system 95, heliostat array control system 92 and wired network control bus router 100, which is optionally deployed in network 94 to handle communications traffic to and among the programmable heliostat control systems 65 in heliostat field 96 more efficiently. In addition, the programmable heliostat control systems 65 provided in heliostat field 97 may communicate with heliostat array control system 93 through network 94 by means of wireless communications. To this end, each of the programmable heliostat control systems 65 in heliostat field 97 is equipped with a wireless communications adapter 102, as is wireless network router 101, which is optionally deployed in network 94 to handle network traffic to and among the programmable heliostat control systems 65 in heliostat field 97 more efficiently. In addition, master control system 95 is optionally equipped with a wireless communications adapter (not shown).

Insolation can vary both predictably (e.g., diurnal variation) and unpredictably (e.g., due to cloud cover, dust, solar eclipses, or other reasons). During these variations, insolation can be reduced to a level insufficient for heating a solar fluid, for example, producing steam for use in generating electricity. To compensate for these periods of reduced insolation, or for any other reason, thermal energy produced by the insolation can be stored in a fluid-based thermal storage system for later use, when needed. The thermal storage system can store energy when insolation is generally available (i.e., charging the thermal storage system) and later release the energy to heat a solar fluid (e.g., water or carbon dioxide) in addition to or in place of insolation. For example, it can be possible at night to replace the radiative heating by insolation of the solar fluid in the solar collection system with conductive and/or convective heat transfer of thermal energy (i.e., enthalpy) from a thermal storage system to the solar fluid. Although the term solar fluid is used herein to refer to the fluid heated in the solar collection system, it is not meant to require that the solar fluid actually be used to produce work (e.g., by driving a turbine). For example, the solar fluid as used herein can release heat energy stored therein to another fluid which can in turn be used to produce useful work or energy. The solar fluid can thus act as a heat transfer fluid or a working fluid.

In one or more embodiments, the thermal storage system includes at least two separate thermal storage reservoirs, which can be substantially insulated to minimize heat loss therefrom. A thermal storage medium can be distributed among or in one of the two storage reservoirs. For example, the thermal storage medium can be a molten salt and/or molten metal and/or other high temperature (i.e., >250° C.) substantially liquid medium. The thermal storage medium can be heated by convective or conductive heat transfer from the solar fluid in a heat exchanger. This net transfer of enthalpy to the thermal storage medium in the thermal storage system is referred to herein as charging the thermal storage system. At a later time when insolation decreases, the direction of heat exchange can be reversed to transfer enthalpy from the thermal storage medium to the solar fluid via the same or a different heat exchanger. This net transfer of enthalpy from the thermal storage medium of the thermal storage system is referred to herein as discharging the thermal storage system.

Superheaters are often an integral part of steam based power systems and are configured to further heat steam that has been produced in these systems (conventional boilers include a preheater, an evaporator, a superheater and optionally reheaters). In the discharging mode of a thermal storage system mentioned above, steam can only potentially be heated to slightly less than the temperature of the thermal storage medium. In embodiments, the maximum temperature of "hot" molten salt may be approximately 500° C. An additional boost of heat may be provided by a superheater to further heat the steam to temperatures of approximately 600° C. In order to achieve higher efficiency in the conversion of steam to electric energy in a steam turbine, higher steam temperature is preferred. Superheaters in solar collection systems (i.e., a solar receiver used to superheat steam) are insolation dependent and cannot be used during periods of low insolation when discharging occurs. According to some embodiments, an independent gas-burning superheater may be used to superheat steam from the thermal storage system and/or from solar collection system.

An example of an independent source of energy for superheating is a gas-fired superheater. Any other non-solar source of energy may be used for the superheater, such as but not limited to fossil fuels, electricity and nuclear energy. Energy from burning gas can be used for the superheater. Alternatively, energy from the exhaust of a gas burner may be used to heat steam in a superheater. The energy boost provided by the independent superheater may be provided during any time of day or at night, or during start-up or shut down of the system. An independent superheater can heat steam generated by a solar collection system or by a thermal storage system or by a combination of steam generated by both the solar collection system and the thermal storage system.

In some embodiments, there are at least four operating periods which determine if and to what extent the use of the independent superheater is needed to further heat the steam generated in the solar receiver and/or the thermal storage system.

At a first operating period, steam generated by the solar collection system is further heated by the gas-fired superheater and flows to the electricity generating system.

At a second operating time, steam generated by the transfer of enthalpy in the thermal energy system is further heated by the gas-fired superheater and flows to the electricity generating system.

At a third operating period, steam generated by the solar collection system flows to the electricity generating system without further heating by the gas-fired superheater.

At a fourth operating period, a mixture of steam generated by the solar collection system and steam generated by the transfer of enthalpy in the thermal energy system is further heated by the gas-fired superheater and flows to the electricity generating system.

In all four operating periods, the steam flowing to the electricity generating system is at essentially the same temperature (e.g., within 10% or less).

The four abovementioned periods can be characterized by any of the following: an insolation level, a time of day, a stage in the operation process or any other factor. For example, a stage of the process may be start-up or shut-down of the system.

An insolation level can be measured instantaneously or as an average over a period of about a second to a period lasting several hours in which present and/or past and/or predicted meteorological data is analyzed. The average level of available insolation can be a real-time measurement over a predetermined amount of time and/or may be a predicted level of insolation, taking into account upcoming conditions such as impending cloud cover, impending clear sky, or the rising and setting of the sun.

The controller may be used for determining if and how much steam is to be heated with an independent superheater. There can be at least four levels of insolation. The third operating period may have the highest level of insolation, the first operating period may have the second highest level of insolation, the fourth operating period may have the third highest level of insolation and the second operating period may have the lowest level of insolation.

At the highest average level of available insolation, (i.e., the $3^{rd}$ operating period) steam from the solar receiver is directed to the steam turbine for electricity production without being heated by the independent superheater.

At the second highest average level of available insolation, (i.e., the $1^{st}$ operating period) steam from the solar receiver is directed to the independent superheater for further heating and then to the steam turbine for electricity production.

At the third highest average level of available insolation, (i.e., the $4^{th}$ operating period) a mixture of steam from the solar receiver, and steam from the thermal energy storage system is directed to the independent superheater for further heating and then to the steam turbine for electricity production.

At the lowest average level of insolation, (i.e., the 2$^{nd}$ operating period) steam generated by the transfer of enthalpy from the thermal storage fluid to the steam is directed to the independent superheater for further heating and then to the steam turbine for electricity production.

Additionally or alternatively, an independent superheater may be utilized at times when insolation levels are predictably low, for example, during start-up, shut-down, or dusk, or at night.

Figure 6:
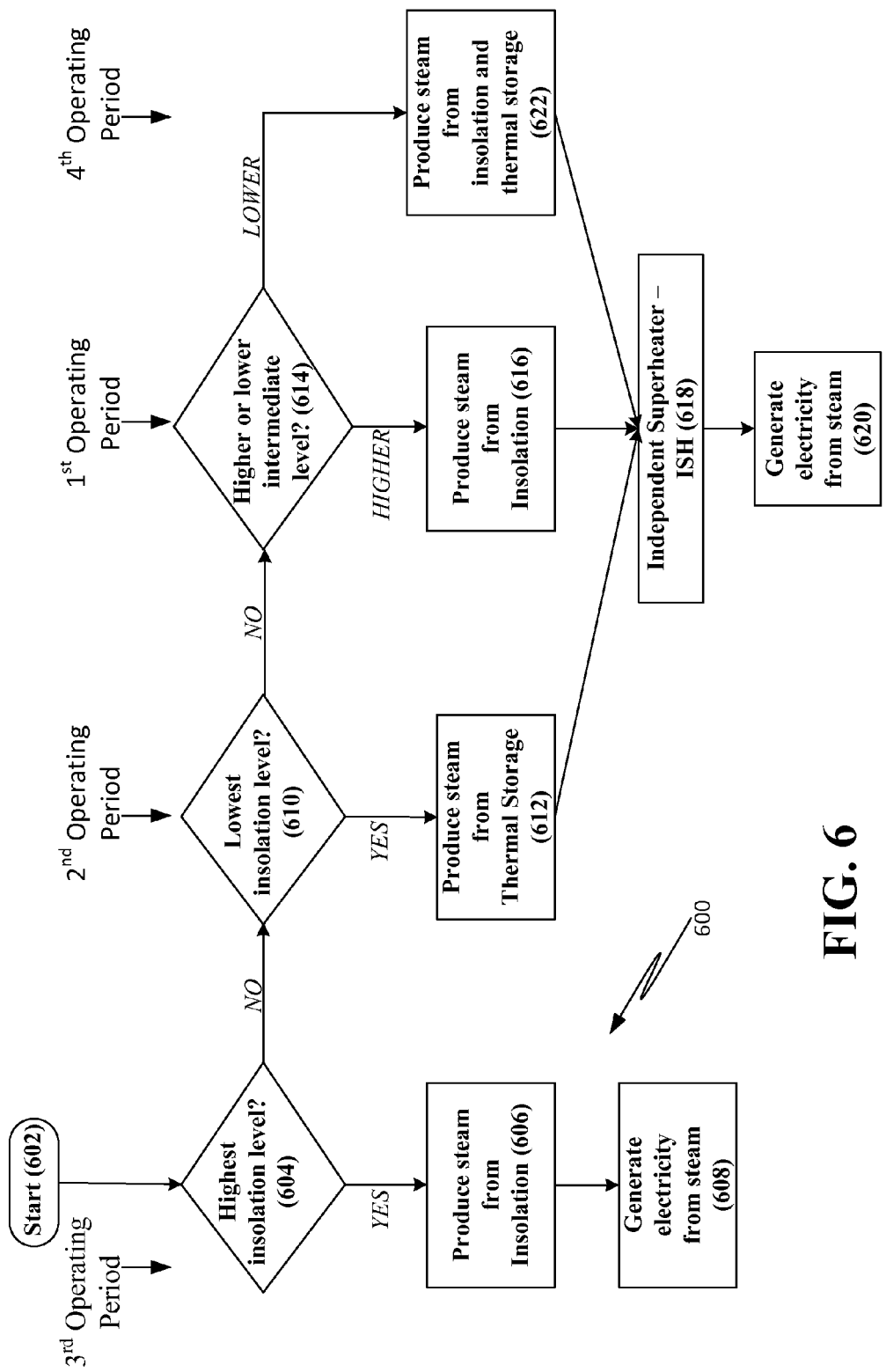
FIG. 6 is a flow diagram illustrating an exemplary method of generating electricity from insolation at various operating levels of insolation, according to one or more embodiments of the disclosed subject matter.

A method for generating electricity 600 using insolation is illustrated in FIG. 6. The process starts at 602 and proceeds to 604, where it is determined whether the average level of available insolation is sufficient to generate steam at the required operating temperature, without the need of the independent superheater. If the level of insolation is greater than a certain threshold (i.e., "Yes") then steam generated in the solar collection system 606 is sent to a turbine to generate electricity 608.

If the determination at 604 indicates there is not sufficient insolation to generate steam at the required temperature (i.e., "No"), without the use of the independent superheater, at 610 a determination is made whether the average level of insolation is at the lowest level. If the determination is "Yes," then steam is generated in the thermal storage system 612 and is directed to the independent superheater (ISH) 618 for further heating and then to a steam turbine for electricity production 620.

If the determination at 610 indicates that there is more than the minimum average level of insolation (i.e., "No") then a determination is made at 614 whether there is sufficient insolation to heat steam to a first temperature, without the need to produce steam from the thermal storage system. If "Yes," steam is generated in the solar collection system 616 and is directed to the independent superheater 618 for further heating and then to a steam turbine for electricity production 620.

If the determination at 614 indicates that the insolation levels are relatively low, steam generated by insolation and steam generated from the transfer of enthalpy from the thermal storage system can be mixed, as indicated by 622, and directed to the independent superheater 618, and then to a steam turbine for electricity production 620.

FIGS. 7A-7D illustrate systems for generating electricity during four levels of insolation.

FIG. 7A illustrates a system 700A for generating electricity in which the average level of available insolation is at the highest level. At this highest level, steam generated in the solar collection system 701, i.e., a solar receiver can be hot enough to send to the steam turbine for efficient electricity production and may not need to be further heated in an independent superheater (ISH) (not shown in FIG. 7A). Steam generated in the solar receiver can flow to a steam turbine 704 for the production of electricity. Optionally, a portion of the steam generated in the solar receiver may be directed to a thermal storage system in which a heat exchanger 706 charges a thermal storage fluid by flowing the thermal storage fluid from the cold storage tank 708 to the hot storage tank 710.

FIG. 7B illustrates system 700B for generating electricity in which the average level of available insolation is at the lowest level (i.e., very low or non-existent levels of insolation, for example at night or in heavily overcast conditions), and there may be insufficient amounts of steam, if any steam at all, generated in the solar collection system 701. At this time, steam is generated by discharging the thermal storage system by flowing thermal storage fluid from the hot storage tank 710 to the cold storage tank 708 through the heat exchanger 706 in which enthalpy is transferred from the thermal storage fluid (e.g., salt) to the solar fluid (e.g., water) to produce steam. The steam may then be directed through an ISH 712 wherein the steam is further heated to a high temperature and flowed to a steam turbine 704 for electricity production.

FIG. 7C illustrates system 700C for generating electricity in which the average level of available insolation is at the second highest level. According to FIG. 7C, steam generated in the solar collection system 701 is further heated by an ISH 712 to a high temperature and flowed to a steam turbine 704 for electricity production. Optionally a portion of the steam generated in or exiting the ISH 712 may be directed to a heat exchanger 706 in which the thermal storage fluid is charged by heating the fluid by transferring enthalpy from the heated steam as it flows from the cold storage tank 708 to the hot storage tank 710.

FIG. 7D illustrates system 700D for generating electricity in which the average level of available insolation is the third highest average level of insolation. According to FIG. 7D, steam generated in the solar collection system 701 is combined with steam generated by the thermal storage system (e.g., via heat exchanger 706) and is directed to the ISH 712 wherein the steam is further heated to a high temperature and flowed to a steam turbine 704 for electricity production.

In all four scenarios of FIGS. 7A-7D, the steam flowing to steam turbine 704 can be at approximately the same temperature.

It will be appreciated that the modules, processes, systems, and sections described above can be implemented in hardware, hardware programmed by software, software instruction stored on a non-transitory computer readable medium or a combination of the above. A system for controlling the thermal storage system, the solar collection system, and/or the electricity generating system can be implemented, for example, using a processor configured to execute a sequence of programmed instructions stored on a non-transitory computer readable medium. The processor can include, but is not limited to, a personal computer or workstation or other such computing system that includes a processor, microprocessor, microcontroller device, or is comprised of control logic including integrated circuits such as, for example, an Application Specific Integrated Circuit (ASIC). The instructions can be compiled from source code instructions provided in accordance with a programming language such as Java, C++, C#.net or the like. The instructions can also comprise code and data objects provided in accordance with, for example, the Visual Basic™ language, or another structured or object-oriented programming language. The sequence of programmed instructions and data associated therewith can be stored in a non-transitory computer-readable medium such as a computer memory or storage device which can be any suitable memory apparatus, such as, but not limited to read-only memory (ROM), programmable read-only memory (PROM), electrically erasable programmable read-only memory (EEPROM), random-access memory (RAM), flash memory, disk drive, etc.

Furthermore, the modules, processes, systems, and sections can be implemented as a single processor or as a distributed processor. Further, it should be appreciated that the steps discussed herein can be performed on a single or distributed processor (single and/or multi-core). Also, the processes, modules, and sub-modules described in the various figures of and for embodiments above can be distributed across multiple computers or systems or can be co-located in a single processor or system. Exemplary structural embodiment alternatives suitable for implementing the modules, sections, systems, means, or processes described herein are provided below, but not limited thereto. The modules, processors or systems described herein can be implemented as a programmed general purpose computer, an electronic device programmed with microcode, a hard-wired analog logic circuit, software stored on a computer-readable medium or signal, an optical computing device, a networked system of electronic and/or optical devices, a special purpose computing device, an integrated circuit device, a semiconductor chip, and a software module or object stored on a computer-readable medium or signal, for example. Moreover, embodiments of the disclosed method, system, and computer program product can be implemented in software executed on a programmed general purpose computer, a special purpose computer, a microprocessor, or the like.

Embodiments of the method and system (or their subcomponents or modules), can be implemented on a general-purpose computer, a special-purpose computer, a programmed microprocessor or microcontroller and peripheral integrated circuit element, an ASIC or other integrated circuit, a digital signal processor, a hardwired electronic or logic circuit such as a discrete element circuit, a programmed logic circuit such as a programmable logic device (PLD), programmable logic array (PLA), field-programmable gate array (FPGA), programmable array logic (PAL) device, etc. In general, any process capable of implementing the functions or steps described herein can be used to implement embodiments of the method, system, or a computer program product (software program stored on a non-transitory computer readable medium).

Furthermore, embodiments of the disclosed method, system, and computer program product can be readily implemented, fully or partially, in software using, for example, object or object-oriented software development environments that provide portable source code that can be used on a variety of computer platforms. Alternatively, embodiments of the disclosed method, system, and computer program product can be implemented partially or fully in hardware using, for example, standard logic circuits or a very-large-scale integration (VLSI) design. Other hardware or software can be used to implement embodiments depending on the speed and/or efficiency requirements of the systems, the particular function, and/or particular software or hardware system, microprocessor, or microcomputer being utilized. Embodiments of the method, system, and computer program product can be implemented in hardware and/or software using any known or later developed systems or structures, devices and/or software by those of ordinary skill in the applicable art from the function description provided herein and with a general basic knowledge of solar collection, thermal storage, electricity generation, and/or computer programming arts.

Features of the disclosed embodiments can be combined, rearranged, omitted, etc., within the scope of the invention to produce additional embodiments. Furthermore, certain features can sometimes be used to advantage without a corresponding use of other features.

It is thus apparent that there is provided in accordance with the present disclosure, system, methods, and devices for boosting steam temperature in a solar energy system. Many alternatives, modifications, and variations are enabled by the present disclosure. While specific embodiments have been shown and described in detail to illustrate the application of the principles of the present invention, it will be understood that the invention can be embodied otherwise without departing from such principles. Accordingly, Applicant intends to embrace all such alternatives, modifications, equivalents, and variations that are within the spirit and scope of the present invention.

The invention claimed is:

1. A system for generating electricity using insolation, comprising:
    a solar collection system constructed to convert solar insolation to thermal energy and transfer the thermal energy to water or water vapor conveyed therethrough to generate superheated steam;
    a thermal energy storage system including at least first and second thermal storage reservoirs configured to store a thermal energy storage fluid comprising at least one of a molten salt and a molten metal and to transfer therefrom enthalpy to water or steam from a supply thereof;
    an electricity generating system including a turbine configured to generate electricity using steam conveyed thereto;
    a heat exchanger connected to the solar collection system, the thermal energy storage system, and the electricity generating system, the heat exchanger being configured such that enthalpy can be selectively transferred:
        from the superheated steam generated by the solar collection system to the thermal energy storage fluid stored by the first and second storage reservoirs, or
        directly to water or steam flowing from said supply to generate steam or superheated steam;
    a gas-fired steam superheater; and
    a control system configured to control the solar collection, the thermal energy storage, and the electricity generating systems and the heat exchanger such that:
        at a first operating period, steam generated by the solar collection system is further heated thereby to an electricity generating temperature solely using thermal energy converted from insolation and is conveyed to the electricity generating system; and
        at a second operating period, steam generated with enthalpy transferred from the thermal storage fluid is further heated by the gas-fired superheater to a higher temperature that is substantially the same as said electricity generating temperature and is then conveyed to the electricity generating system,
    wherein said first and second operating periods are characterized by at least one of an insolation level, a time of day, or a stage in an operation process.

2. The system of claim 1, wherein:
    the control system is further configured to control the solar collection, the thermal energy storage, and the electricity generating systems and the heat exchanger such that, at a third operating period, steam generated by the solar collection system is further heated by the gas-fired superheater to a higher temperature that is substantially the same as said electricity generating temperature and is then conveyed to the electricity generating system, and
    said third operating period is also characterized by at least one of the insolation level, the time of day, or the stage in the operation process.

3. The system of claim 2, wherein:
    the control system is further configured to control the solar collection, the thermal energy storage, and the electricity generating systems and the heat exchanger such that, at a fourth operating period, a mixture of steam generated by the solar collection system and steam generated by the transfer of enthalpy from the thermal storage fluid is further heated by the gas-fired to a higher temperature that is substantially the same as said electricity generating temperature and is conveyed to the electricity generating system, and said fourth operating period is also characterized by at least one of the insolation level, the time of day, or the stage in the operation process.

4. The system of claim 3, wherein the first operating period has the highest level of insolation, the third operating period has the second highest level of insolation, the fourth operating period has the third highest level of insolation and the second operating period has the lowest level of insolation.

5. The system of claim 1, wherein the stage in the operation process is a start-up stage or a shut-down stage of the solar collection system.

6. The system of claim 1, wherein the solar collection system includes a solar receiver and a plurality of heliostats configured to reflect insolation onto the solar receiver.

7. The system of claim 1, wherein:
the control system is further configured to control the solar collection, the thermal energy storage, and the electricity generating systems and the heat exchanger such that, at a fourth operating period, a mixture of steam generated by the solar collection system and steam generated by the transfer of enthalpy from the thermal storage fluid is further heated by the gas-fired to a higher temperature that is substantially the same as said electricity generating temperature and is conveyed to the electricity generating system,
said fourth operating period is also characterized by at least one of the insolation level, the time of day, or the stage in the operation process.

8. A method for generating electricity using insolation, comprising:
at a first operating period, generating steam at a first temperature and a pressure greater than atmospheric pressure in a solar collection system using insolation and further heating the steam therein using insolation to a second temperature for generating electricity; and
at a second operating period, generating steam at a third temperature in a heat exchanger with enthalpy transferred from a thermal storage fluid and further heating the steam in a gas-fired superheater to a fourth temperature for generating electricity,
wherein the second and fourth temperatures are substantially the same temperature.

9. The method of claim 8, further comprising:
at a third operating period, generating steam at a fifth temperature at a pressure greater than atmospheric pressure in the solar collection system using insolation and further heating it in the gas-fired superheater to a sixth temperature for generating electricity,
wherein the second, fourth, and sixth temperatures are substantially the same temperature.

10. The method of claim 9, further comprising:
at a fourth operating period, (i) combining steam generated at a seventh temperature in the solar collection system using insolation with steam generated at an eighth temperature in the heat exchanger using enthalpy transferred from the thermal storage fluid; and
(ii) further heating the combined steam in the gas-fired superheater to a ninth temperature,
wherein the second, fourth, and ninth temperatures are substantially the same temperature.

11. The method of claim 10, wherein the first to fourth operating periods are characterized by at least any one of an insolation level, a time of day, or a stage in the operation process.

12. The method of claim 11, wherein the first operating period has the highest level of insolation, the third operating period has the second highest level of insolation, the fourth operating period has the third highest level of insolation, and the second operating period has the lowest level of insolation.

13. The method of claim 11, wherein a stage in the operation process is a start-up stage or a shut-down stage of the solar collection system.

14. The method of claim 8, wherein the generating steam in a solar collection system using insolation includes reflecting insolation onto one or more solar receivers of the solar collection system using a plurality of heliostats.

15. The method of claim 8, wherein, at the first operating period, at least a portion of the steam generated and further heated using insolation is directed to a heat exchanger where enthalpy from the steam is transferred to a thermal storage fluid comprising at least one of a molten salt and a molten metal.

16. The method of claim 8, further comprising:
at a fourth operating period, (i) combining steam generated at a seventh temperature in the solar collection system using insolation with steam generated at an eighth temperature in the heat exchanger using enthalpy transferred from the thermal storage fluid; and
(ii) further heating the combined steam in the gas-fired superheater to a ninth temperature,
wherein the second, fourth, and ninth temperatures are substantially the same temperature.

17. A method for generating electricity using insolation, comprising:
at a first time, producing steam at an electricity generating temperature using sequential heating by insolation and then, by a gas-fired superheater, conveying the produced steam to an electricity generating system and generating electricity from the steam; and
at a second time, producing steam at the electricity generating temperature using sequential heating by enthalpy stored in a thermal energy storage and then, by the gas-fired superheater, conveying the produced steam to an electricity generating system and generating electricity from the steam.

18. The method of claim 17, further comprising, at other times, producing steam at the electricity generating temperature by heating a first portion of the steam using insolation, by heating a second portion of the steam using enthalpy stored in a thermal energy storage, and by subsequent heating of the first and second portions by the gas-fired superheater.

19. The method of claim 17, further comprising, at other times, producing steam at the electricity generating temperature solely by heating using insolation.

20. The method of claim 19, where at least a portion of the produced steam is directed to a heat exchanger where enthalpy from the at least a portion of the produced steam is transferred to a thermal storage fluid and stored therein.

* * * * *